United States Patent [19]

Blank

[11] 4,272,590
[45] Jun. 9, 1981

[54] WATER-BASED GLYOXAL CURED COATING COMPOSITIONS

[75] Inventor: Werner J. Blank, Wilton, Conn.

[73] Assignee: American Cyanamid Company, Stamford, Conn.

[21] Appl. No.: 32,208

[22] Filed: Apr. 23, 1979

[51] Int. Cl.$^3$ .................... B32B 15/08; B32B 27/42
[52] U.S. Cl. ........................ 428/460; 260/29.6 T; 260/29.6 TA; 260/29.6 H; 260/29.7 AT; 427/388.3; 427/393; 427/393.5; 428/461; 428/462; 428/463; 428/504; 428/514
[58] Field of Search ............... 526/303, 55, 23, 16; 260/29.7 AT, 29.6 H, 29.6 TA, 29.7 R, 29.6 T; 525/55; 428/460, 462, 463, 504, 514, 461; 427/388.3, 393, 393.5

[56] References Cited

U.S. PATENT DOCUMENTS

| | | | |
|---|---|---|---|
| 2,679,494 | 5/1954 | Thomas | 525/55 |
| 2,908,659 | 10/1959 | Shashoua | 260/32.6 N X |
| 3,298,925 | 1/1967 | Mosbach | 260/29.6 HN X |
| 3,556,932 | 1/1971 | Coscia et al. | 526/55 X |
| 3,597,313 | 8/1971 | Williams et al. | 526/55 X |
| 4,075,141 | 2/1978 | Porter, Jr. et al. | 526/23 X |
| 4,082,730 | 4/1978 | Rave | 526/55 X |
| 4,122,071 | 10/1978 | Moriya et al. | 526/55 X |

*Primary Examiner*—Michael R. Lusignan
*Assistant Examiner*—Thurman K. Page
*Attorney, Agent, or Firm*—Bruce F. Jacobs

[57] ABSTRACT

Storage-stable, room-temperature-curing, water-based coating compositions are prepared from emulsified copolymers containing amide functionality and using glyoxal as the cross-linking agent.

11 Claims, No Drawings

WATER-BASED GLYOXAL CURED COATING COMPOSITIONS

This invention relates to storage-stable, room-temperature-curing, water-based coating compositions which are prepared from emulsified acrylic polymers containing amide functionality and glyoxal as the cross-linking agent.

U.S. Pat. No. 2,787,603 describes an acrylic emulsion cross-linked with amino-formaldehyde and phenol-formaldehyde resins. This system requires a high baking temperature for curing to occur.

U.S. Pat. No. 2,895,930 describes a combination of an oil soluble epoxy modified alkyd resin, a vinylidene polymer, and an amino-formaldehyde resin. This system requires high baking temperatures to obtain a cure.

U.S. Pat. No. 3,231,537 describes a self-cross-linking acrylic emulsion containing methylolamides as functional sites. These polymers give good low temperature cure response but require the difficult incorporation of a highly reactive monomer such as methylolacrylamide into the emulsion. Hence during the emulsion polymerization process, high temperature must be used wherein self-condensation and gelation of the emulsion occurs rapidly. Thus satisfactory emulsion stability can only be objected at essentially neutral pH conditions where the reactivity is also the lowest. Furthermore, the methylol group in methylolacrylamide, when in aqueous solution, is in equilibrium between free formaldehyde and combined formaldehyde. The free formaldehyde can readily evaporate and as a result cause odor problems—even after the emulsion is applied to a substrate and cured.

The present invention, to the contrary, uses glyoxal, as a reactant dialdehyde, and adds it after the polymerization is completed. Hence the polymerization is not restricted to essentially neutral conditions. Furthermore glyoxal does not evaporate even if applied over a large surface area substrate—thus there is no odor problem in the resultant cross-linked product.

U.S. Pat. No. 3,556,932 describes a water soluble vinyl amide polymer with a certain contest of glyoxal groups. This reference uses a solution of acrylic polymer wherein the primary constituent is acrylamide. The resin is subject to attack by water. To the contrary, the present invention uses an emulsion of acrylic polymers with relatively low amounts of amide groups and produces a product which is more stable and not subject to water attack.

Accordingly, it is an object of the present invention to produce coating compositions which are storage stable, cure at room temperature, and contain no organic solvent or free formaldehyde.

The coating compositions herein disclosed are prepared from an emulsified polymer having about 0.2 to 4, preferably 0.4 to 2.0, moles of amide functionality per 1000 grams of polymer, a cross-linkingly effective amount of a reactive dialdehyde, i.e. glyoxal, and water. Generally the glyoxal is used in amounts so as to provide about 0.4 to 2.0 aldehyde groups per amide group.

The emulsified polymer used herein is preferably prepared by emulsion polymerization under standard emulsion conditions including incorporating small amounts of surface active agents or colloidal dispersing agents. In a standard process, the desired monomer blend is emulsified in deionized and deaerated water in the presence of a surfactant and slowly heated in the presence of radical initiator. After the polymerization has started which shows itself by an exothermic reaction, the remainder of the monomer blend is slowly fed into the emulsion. Sometimes, additional amounts of surfactant or initiator are added during or after the polymerization. The polymerization temperature can be at reflux of the mixture or as low as room temperature depending on the type of initiator utilized. Commonly used initiators are from the family or inorganic catalysts such as persulfate, percarbonate, peroxide, or azo compounds. The choice of initiator does not appear to be critical. Optionally, the polymer may be prepared by solution polymerization in a suitable solvent with subsequent emulsification of the resulting polymer in water.

The polymer may be prepared from ethylenically-unsaturated monomers which are well known in the art. Suitable monomers include acrylic or methacrylic acid or alkyl esters thereof with the alkyl group containing about 1-18 carbon atoms; styrene and derivatives thereof; alkyl vinyl ethers having alkyl groups of about 1-18 carbon atoms; acrylonitrile and derivatives thereof; ethylene, conjugated dienes, vinyl esters, and esters and half-esters of other acids such as maleic, fumaric and itaconic acids. Specific monoers useful herein include such as acrylic acid, methacrylic acid, methylacrylate, ethylacrylate, butylacrylate, 2-ethylhexylacrylate, methylmethacrylate, ethylmethacrylate, butylmethacrylate, acrylonitrile, styrene, methylstyrene, ethylene, butadiene, and vinyl acetate.

Along with the above monomers, there must be at least one amide-functional monomer such as acrylamide, methacrylamide, and crotonamide. Optionally other monomers containing functional groups such as carboxyl or hydroxy groups can be used.

A monomer composition for a commercial emulsion could contain at least two or more than five different monomers to achieve a certain performance. The performance of the emulsion polymer will depend, to a large extent, on the composition of the monomer blend. For example, monomers with an alkyl group with a chain length of $C_2$ to $C_8$ give polymers with soft and elastic properties. A higher chain length than $C_8$ reduces the elasticity. Examples for such monomers giving films with high elasticity are ethylacrylate, butylacrylate, 2-ethylhexyl acrylate. The methacrylic acid analogs of the above mentioned monomers give polymers which are less flexible. Vinyl ethers of alcohols can also be used to flexibilize a polymer. Such vinyl ethers can only be radically polymerized in the presence of other radically polymerizable monomers such as alkyl acrylates. As "hard" monomers giving the polymer backbone rigidity and stiffness, monomers such as styrene, methylmethacrylate, or acrylonitrile can be used. For those skilled in the art, the selection of monomers for a certain performance does not present a problem.

Amide groups are functional sites because they are readily capable of reaction with glyoxal or another dialdehyde to form a methylol compound, and under acidic conditions, they further react with the methylol compounds.

As stated above, the reaction of glyoxal with a polyacrylamide polymer is known (U.S. Pat. No. 3,556,932) for wet strength paper applications. These products, although excellent for paper, still do not offer the kind of water-resistance required for other applications. Paper is an extremely water-sensitive substrate and, therefore, a treatment for paper having only limited water-resistance can already significantly improve the performance of paper. Unfortunately, this polyacrylamide glyoxal composition of the previous invention is still too water-sensitive for other applications, such as on metal or wood where a highly water-resistant coating is desired. Another disadvantage of the previous invention is the low application solids of about 8 to 11%. To achieve a desired coating thickness for metal, a wet film of about 10 to 15 mil would have to be applied to achieve a dry film thickness of 0.8 to 1.3 mil. Practically, this would be extremely difficult because normally used paint spray equipment usually deposits in one spray application 1 to 3 mil of wet film. The rather high energy requirement for the evaporation of water would furthermore reduce the practicality of a low solids system versus other higher solids coating systems. These disadvantages would make such a system unacceptable for the application on metal or wood. Another disadvantage of the previous invention is the temporary nature of the cross-linking reaction between the polyacrylamide polymer and glyoxal. This feature is very important for paper, so paper can be recycled. This property is highly undesirable for a permanent protective coating for wood or metal or plastics where exposure for long time periods to moisture or chemicals is required.

It was, therefore, highly surprising to discover, that emulsions containing only small amounts of acrylamide could be cross-linked with glyoxal or another dialdehyde and the so cross-linked films did not have the disadvantage of the previous invention. The present invention consisting of an amide containing emulsion polymer and glyoxal dries within 8 to 16 hours at room temperature to a film which is highly resistant to water, and does not blush, blister, and lose its adhesion to the substrate. The same emulsion without the glyoxal is softened by water, whiteners, blisters, and looses adhesion. Initially, it was assumed that this improvement might be only of temporary nature, and longer immersion times in water would create the same problems as in the previous invention. It was surprising to find that even after an immersion time in water of one week at room temperature no change in performance was observed. This clearly indicates that the kind of cross-linking reaction obtained in these emulsion systems is of a permanent, not temporary, nature. The application solids of this emulsion is not restricted to about 10%; solids as high as 30–50% can be used without difficulty. This cure behavior at room temperature is very desirable; the increasing cost of energy makes baked coating systems very expensive. The availability of energy is also a problem. In most industrial coatings applications, large amounts of energy are consumed to heat the air in a baking oven and to heat the substrate.

Conventional solvent-based baking systems require large amounts of fresh make up during the baking operation in order not to exceed the safe explosive limits in the oven. Conventional amino cross-linked water-based coatings do not have the disadvantage of requiring large amounts of make up air during baking, but they still contain solvents and also eliminate solvents during the baking cycle. They, therefore, require less energy than solvent-based coatings, but conventional water-based coatings still require high baking temperatures, so the energy required to heat the substrate is still the same versus solvent-based coatings.

The system of this invention requires only sufficient energy to evaporate the water; this is about one-tenth of the energy required to bake a conventional solvent-based paint. Furthermore, the films formed by a composition of this invention do not require complete cure. The dried uncross-linked films are sufficiently hard to be handled and continue to cross-link at room temperature and give the final performance in about 8 hours to a week.

The possibility to obtain cure and cross-linking under mild conditions or room temperature is also very important for substrates which cannot be cured at higher temperatures, such as plastics, aluminum alloys, or completely assembled machinery. It is a common practice to paint farm equipment, heavy earth moving equipment, and airplanes after complete assembly. Such equipment contain a number of heat sensitive materials, such as rubber and plastic parts which cannot be heated to higher temperatures. The present solvent-based air drying alkyd paint used on farm implements are satisfactory in their performance, but their application is a major source of pollution. Water-soluble alkyd paints have not shown the desired performance characteristics because amine solubilized carboxyl group containing resins are used, which retain their water-sensitivity after drying. On airplanes, two component isocyanate coatings are used. Although excellent in performance, these systems do pollute the air and also require special application equipment.

The present room temperature curing emulsion has shown excellent shelf-life; it does not require a catalyst for cure; and the reaction product of the cross-linking reaction is water. A major use for such a system is in coatings for metal, plastic, and wood, and it could also be used as an adhesive and binder in textile and other areas where a permanent coating or bond is desired.

Coatings of this invention can be used in clear or pigment form in primer or top coat applications. Sometimes it might be desirable to combine these emulsions with conventional melamine or urea-formaldehyde cross-linking compounds to modify their performance. The surfactants used to prepare these emulsions can be of the cationic, anionic, or nonionic class. The choice of surfactant will depend on the nature of the monomers used and the required performance characteristics of the emulsion. Corrosion, water-resistance, stability, and flow characteristics of the emulsion will be significantly influenced by the choice of surfactants. The level of surfactants used is normally between 0.1 to 5%. Under certain conditions, it is possible to prepare surfactant free emulsions.

In formulating the finished emulsions for application, a large variety of additives can be used. Cosolvents such as propylene glycol, glycol ethers, ketones, alcohols, and hydrocarbons can be used to improve flow characteristics and film formations. Quite often additional surfactants and wetting or dispersing agents are added to the emulsion after manufacture to facilitate pigmentation. Antifoam agents may also be used to improve application characteristics.

EXAMPLE 1

A suitable 1 liter reactor equippd with an anker agitator, thermometer, nitrogen inlet, monomer inlet, and reflux condenser is charged with 150 grams of deionized water and 9 grams of a 30% solution of a sulfosuccinate surfactant (the trade name of which is AEROSOL A-102, American Cyanamid Company). This blend is heated to reflux and all the oxygen is displaced from the reactor with nitrogen. In a separate blending reactor equipped with stirrer and nitrogen inlet, 135 grams of butylacrylate, 120 grams of methylmethacrylate, 30 grams of acrylamide, 15 grams of methacrylic acid, 18 grams of the above 30% solution of a sulfosuccinate surfactant (AEROSOL A-102), and 300 parts of deionized water are mixed and emulsified. A third mixture consisting of a 5% ammonium persulfate solution is deionized water is prepared.

After the reactor blend has achieved reflux temperature, reflux is continued for 10–15 minutes, and the reactor is cooled to 80° C. The monomer blend in the blending reactor is thoroughly deaerated by saturating the emulsion with nitrogen and keeping a steady flow of nitrogen through the monomer mix. Six ml. of the 5% ammonium persulfate solution are added to the reactor and 24 ml. of the same solution are added to the monomer blend.

Forty ml. of the monomer blend are then fed into the reactor. After a few minutes, the exotherm reaction will carry the batch temperature to 86° C. The reactor is cooled to about 80° C. After about five minutes after the monomer has been added, a bluish color appears in the reaction mixture. The mixture is kept for about 15 minutes and then the addition of the rest of the monomer blend is started. The remainder of the monomer blend is fed into the reactor within two hours. After all the monomer has been added, keep the reaction at 80° C. for one hour. Solids determination gives a conversion of 99.5%. The characteristics of the emulsion are as follows:

| Calculated solids | 38.4% |
| Actual solids | 38.1% |
| Viscosity (Brookfield 25° C.) | 162 cps |

EXAMPLE 2

Fifty grams of the emulsion as prepared in Example 1 are blended with 30 ml. of deionized water and 2 ml. of a 40% aqueous glyoxal solution. The ratio of amide group to glyoxal is 1:0.65. The resulting blend has a viscosity of about 10 centipoise and a pH of 4.1. The application solids is 24%. A wet film of about 3 mil is drawn on Alodine 1200S pretreated aluminum panels. (This is a chromate treatment from Amchem Corporation, Ambler, Pennsylvania). As a standard, a wet film of about 2 mil is drawn on another Alodine 1200S panel using the unmodified emulsion of Example 1. Both films dry to a uniform clear, hard, and glossy layer. The dry film thickness of both systems is about 0.8 mil. The films do not have any film imperfections. Both films are stored at room temperature and about 60% relative humidity for about 3 days. The coating is then immersed in deionized water. After an immersion time of one hour, the unmodified film of Example 1 has whitened. Example 2 is unchanged. After 16 hours immersion, the Example 1 film is completely white, blistered, and has lost adhesion. The film from Example 2 is slightly shorter, but unchanged. After an immersion time of 168 hours in deionized water, the film of Example 1 is completely dissolved; the film of Example 2 is unchanged, with the exception that the film is slightly softened. Only under very careful observation can a trace of blushing be found. No blisters are visible. The film hardness of Examples 1 and 2 is 2.1 Knoop units. Impact resistance with both systems is >60 in./lbs. reverse impact. At a higher impact, the aluminum substrate failed. Methylethyl ketone solvent resistance is about 50 rubs for Example 1 and 200+ rubs for Example 2. These results clearly indicate that the presence of glyoxal in Example 2 has caused an irreversible cross-linking reaction which gave significantly improved performance. The performance of Example 2 would make such a system acceptable for an industrial air drying coating; Example 1 would not pass any tests. The emulsion of Example 2 is aged for eight months. The aged emulsion was unchanged, and films drawn down showed no performance change versus the unaged system.

EXAMPLE 3

Example 1 is repeated with the exception that the monomer blend has the following composition:
135 grams butylacrylate, 60 grams acrylonitrile,
60 grams methylmethacrylate, 30 grams acrylamide,
15 grams methacrylic acid, 18 grams of a 30% aqueous solution of AEROSOL A-102, and 24 grams of a 5% solution of ammonium persulfate. The rest of the reactor charge and the process are identical to Example 1.

The resulting emulsion has a viscosity of 60 cps at room temperature, a non-volatile of 36.9% and a pH of 4.6. The calculated acid number is 32.6, the amide content is 1.41 MEQ/gram polymer

EXAMPLE 4

Fifty grams of the emulsion prepared in Example 3 are blended with 2 ml. of a 40% aqueous solution of glyoxal and 30 ml. of deionized water. The ratio of amide to glyoxal is 1:0.65. The pH of the blend is about 4.1. A film is drawn down on Alodine 1200 pretreated aluminum panels. A comparative draw down is made from the emulsion of Example 3. The test results are as follows: Air dry one day at room temperature:

|  | Example 3 | Example 4 |
| --- | --- | --- |
| Film thickness, mil | 1.0 | 1.0 |
| Knoop hardness | 6.5 | 7.0 |
| MEK rubs | 100 | 200+ |
| Water immersion, 16 hours* | 0, Blistered | 10 |
| 168 hours |  | 10 |

*10 = excellent; 0 = destroyed

EXAMPLE 5

Example 1 is repeated in every detail with the exception that the AEROSOL A-102 surfactant is replaced with AEROSOL A-103.

The resulting emulsion has a viscosity of 255 cps and a pH of 4.15. The solids content is 38.1%. To 50 grams of emulsion, 2 ml. of a 40% glyoxal solution are added. The tests as shown in Example 2 are repeated.

The glyoxal free system is completely destroyed after one hour water immersion. The glyoxal containing emulsion is completely unchanged after 168 hours water immersion. Knoop hardness is 3.4, reverse impact is >60 in./lbs., and MEK resistance is more than 200 rubs without attack. The glyoxal containing emulsion is aged for eight months at room temperature. After this prolonged aging period, the emulsion is unchanged in viscosity. Films are prepared as before. The films prepared from the aged emulsion give the same performance as films prepared from the unaged system. No change in hardness of water-resistance was observed.

This stability is truely outstanding for a room temperature cross-linking system.

EXAMPLE 6

In a blending tank, 40 parts by weight of a phosphate surfactant, Gafac PE-510 (GAF Corporation) are blended with 345.6 parts by weight of deionized water and 6.5 parts of dimethylaminoethanol.

The reactor, equipped as shown in Example 1, is charged with 128 parts of the above surfactant solution and 508 parts of deionized water. The blend is heated to reflux under a nitrogen blanket.

In a separate blending tank, 540 parts by weight of butylacrylate, 360 parts methylmethacrylate, 240 parts acrylonitrile, 60 parts acrylamide, 936 parts deionized water, 264 parts of the above surfactant solution, and 96 parts of a 5% aqueous ammonium persulfate solution are blended. The monomer blend is mixed and sparged with nitrogen.

The refluxing surfactant solution in the reactor is cooled to 80° C., and 24 parts of a 5% aqueous ammonium persulfate solution are added to the reactor. About 1/10 of the monomer blend is fed into the reactor. The polymerization starts after about five minutes as seen by the exotherm reaction. The blend is cooled to 80° C. and held at this temperature under continuous agitation for 15 minutes. A bluish-white emulsion is formed. The polymerization is continued by feeding the remainder of the monomer blend into the reactor over a 90 minute period. The resulting emulsion has a very fine particle size and a yellowish to clear appearance. The non-volatile is 38%. The emulsion solids contains 0.7 MEQ/gram of amide groups.

The following blends of the emulsion with glyoxal were made as follows:

|  | 0 | −1 | −2 | −3 | −4 |
|---|---|---|---|---|---|
| Emulsion Example 6 | 100 | −100 | −100 | −100 | −100 |
| Glyoxal, 40% | — | 5.1 | 5.1 | 7.7 | 2.7 |
| Triethylamine | — | — | 0.8 | — | — |
| Mole amide groups | 0.027 | 0.027 | 0.027 | 0.027 | 0.027 |
| Mole glyoxal | 0 | 0.035 | 0.035 | 0.053 | 0.0186 |
| Ratio of amide/glyoxal | — | 1.29 | 1.29 | 1.96 | 0.69 |

After an aging time of 24 hours, system 2 has gelled; all other systems were unchanged. The non-volatile of all remaining 4 systems is about 39%. Films are drawn down on Alodine 1200S at dry film thickness of 0.8–1.0 mil.

After an aging time of 72 hours at room temperature, the films are immersed in deionized water.

|  | 120 Hours Water Immersion | |
|---|---|---|
|  | Blistering* | Whitening* |
| 0 | 0** | 0 |
| −1 | 8 | 8 |
| −3 | 4 | 9 |
| −4 | 9 | 7 |

Rating:
10 = excellent, no attack
0 = completely destroyed
**After 2 hours immersion:
0 = blistering
2 = whitening As seen from this table, the higher ratio of glyoxal gives poorer adhesion, indicating possibly free glyoxal. Higher levels of glyoxal give apparently a more complete cross-linking as expressed in a lesser degree of whitening.

What is claimed is:

1. A coating composition for preparing water-resistant coatings comprising an emulsified copolymer containing about 0.2 to 4 moles of amide functionality per 1000 grams of copolymer, a cross-linkingly effective amount of glyoxal, and water.

2. The composition of claim 1 wherein the copolymer is prepared by emulsion polymerization.

3. The composition of claim 1 wherein the copolymer is prepared from one or more amide-containing monomers and one or more monomers selected from acrylic acid, methacrylic acid alkyl esters of acrylic acid and methacrylic acid having 1 to 18 carbon atoms in the alkyl groups, styrene, α-methylstyrene, alkyl vinyl ether having 1 to 18 carbon atoms in the alkyl group, acrylonitrile, methacrylonitrile, ethylene, butadiene, and vinyl acetate.

4. The composition of claim 3 wherein the amide-containing monomer is selected from the group consisting of acrylamide, methacrylamide, and crotonamide.

5. The composition of claim 1 wherein the copolymer is prepared from butylacrylate, methylmethacrylate, methacrylic acid, and acrylamide.

6. The composition of claim 1 wherein the copolymer is prepared from butylacrylate, acrylonitrile, methylmethacrylate, methacrylic acid, and acrylamide.

7. The composition of claim 1 wherein the copolymer is present in about 30 to 50 percent by weight of the composition.

8. The composition of claim 1 wherein the copolymer contains about 0.4 to 2.0 moles of amide functionality per 1000 grams of copolymer.

9. The composition of claim 1 wherein the glyoxal is present in amounts so as to provide about 0.4 to 2.0 aldehyde groups per amide group.

10. The cured composition of claims 1, 4, 7 or 9.

11. The cured composition of claims 1, 4, 7 or 9 upon a substrate selected from the group consisting of metal, plastic and wood.

* * * * *